US008053699B2

(12) United States Patent
Roscoe et al.

(10) Patent No.: US 8,053,699 B2
(45) Date of Patent: Nov. 8, 2011

(54) ELECTRICAL PULSE CIRCUIT

(75) Inventors: George William Roscoe, West Hartford, CT (US); Thangavelu Asokan, Bangalore (IN); Adnan Kuttubudin Bohori, Bangalore (IN)

(73) Assignee: General Electric Company, Schenectady, NY (US)

( * ) Notice: Subject to any disclaimer, the term of this patent is extended or adjusted under 35 U.S.C. 154(b) by 1015 days.

(21) Appl. No.: 11/945,677

(22) Filed: Nov. 27, 2007

(65) Prior Publication Data

US 2009/0134128 A1 May 28, 2009

(51) Int. Cl.
*B23K 10/00* (2006.01)

(52) U.S. Cl. ......... 219/121.39; 219/121.54; 219/121.52; 219/121.48; 219/121.57

(58) Field of Classification Search ............. 219/121.39, 219/121.45, 121.48, 75, 121.54, 121.57
See application file for complete search history.

(56) References Cited

U.S. PATENT DOCUMENTS

| | | | | |
|---|---|---|---|---|
| 6,521,858 | B1 * | 2/2003 | Barnett | 219/121.46 |
| 6,838,635 | B2 * | 1/2005 | Hoffman et al. | 219/121.43 |
| 2001/0037997 | A1 * | 11/2001 | Barnett | 219/121.48 |

OTHER PUBLICATIONS

U.S. Appl. No. 11/847,526 , "ARC Flash Elimination System, Apparatus, and Method", filed Aug. 30, 2007 by George W. Roscoe.
U.S. Appl. No. 11/747,970, "ARC Detector", filed May 14, 2007 by Ravinuthala R. Rao.
U.S. Appl. No. 11/735,673 , "Ablative Plasma Gun", filed Apr. 16, 2007 by Thangavelu Asokan.
U.S. Appl. No. 11/693,489 , "Timing-Based Servo Verify Head and Method Thereof", filed Mar. 29, 2007 by Matthew P. Dugas.

* cited by examiner

*Primary Examiner* — Mark Paschall
(74) *Attorney, Agent, or Firm* — Cantor Colburn LLP

(57) ABSTRACT

An electrical pulse circuit is disclosed. The electrical pulse circuit is in connection with a first pair of electrodes defining a first gap between ends thereof and a second pair of electrodes defining a second gap between ends thereof. The second gap is disposed proximate to the first gap. The circuit includes a controller, a first electrical pulse source in power connection with the first pair of electrodes, and a second electrical pulse source in power connection with the second pair of electrodes. The first electrical pulse source is productive of a high voltage low current arc across the first gap in response to the controller and the second electrical pulse source is productive of a low voltage high current arc across the second gap in response to the controller and the high voltage arc.

17 Claims, 7 Drawing Sheets

ELECTRICAL PULSE CIRCUIT

BACKGROUND OF THE INVENTION

The present invention relates generally to pulse circuits, and more particularly to high current pulse circuits.

Electric arc devices are used in a variety of applications, including series capacitor protection, high power switches, acoustic generators, shock wave generators, pulsed plasma thrusters and arc mitigation devices. Such devices include two or more main electrodes separated by a gap of air or another gas. A bias voltage is applied to the main electrodes across the gap.

One means to trigger such electric arc devices is via a high current pulse. For example, a high current pulse source can provide the high current pulse to trigger a plasma gun to generate conductive ablative plasma vapors between the main electrodes. The high current pulse source can also be used in devices such as rail guns, spark gap switches, lighting ballasts, and series capacitor protection, for example.

The high current pulse is typically greater than about 5,000 Amps (5 kA), such as to generate adequate plasma vapors, for example. Additionally, high voltage, greater than about 5,000 Volts (5 kV), is utilized to overcome a breakdown voltage of air and initiate the high current pulse across pulse electrodes, such as plasma gun electrodes for example. Typical high current pulses may be known as lightning pulses that can be defined as having an 8 microsecond rise time and a 20 microsecond fall time. Circuits to generate such high current pulses commonly utilize costly high-energy capacitors that can have capacitive values in the millifarad range. While existing high current pulse sources are suitable for their intended purpose, there is a need in the art for a high current pulse source that overcomes these drawbacks.

BRIEF DESCRIPTION OF THE INVENTION

An embodiment of the invention includes an electrical pulse circuit. The electrical pulse circuit is in connection with a first pair of electrodes defining a first gap between ends thereof and a second pair of electrodes defining a second gap between ends thereof. The second gap is disposed proximate to the first gap. The circuit includes a controller, a first electrical pulse source in power connection with the first pair of electrodes, and a second electrical pulse source in power connection with the second pair of electrodes. The first electrical pulse source is productive of a high voltage low current arc across the first gap in response to the controller and the second electrical pulse source is productive of a low voltage high current arc across the second gap in response to the controller and the high voltage arc.

Another embodiment of the invention includes an electrical pulse circuit in connection with an ablative plasma gun subassembly comprising a first pair of gun electrodes, a second pair of gun electrodes, and ablative material disposed proximate at least one of the first and the second pairs of gun electrodes. The ablative plasma gun subassembly is disposed within a main arc device including two or more main electrodes, each electrode connected to an electrically different portion of a main electric circuit. The electrical pulse circuit includes a controller, a first electrical pulse source in power connection with the first pair of gun electrodes, and a second electrical pulse source in power connection with the second pair of gun electrodes. The first electrical pulse source is productive of a high voltage low current arc across the first pair of gun electrodes in response to the controller and the second electrical pulse source is productive of a low voltage high current arc across the second pair of gun electrodes in response to the controller and the high voltage arc. The ablative plasma gun is responsive to the low voltage high current arc to inject an ablative plasma into a main gap between the two or more main electrodes of the main arc device, thereby triggering an arc between the two or more main electrodes.

These and other advantages and features will be more readily understood from the following detailed description of preferred embodiments of the invention that is provided in connection with the accompanying drawings.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention provides a dual power source high current pulse generator. The dual power source pulse generator utilizes a first power source to initiate a first (high voltage, low current) arc to create a zone of decreased impedance (ionized air, for example), and a second power source to develop a second (low voltage, high current) arc within the zone of decreased impedance.

Figure 1:
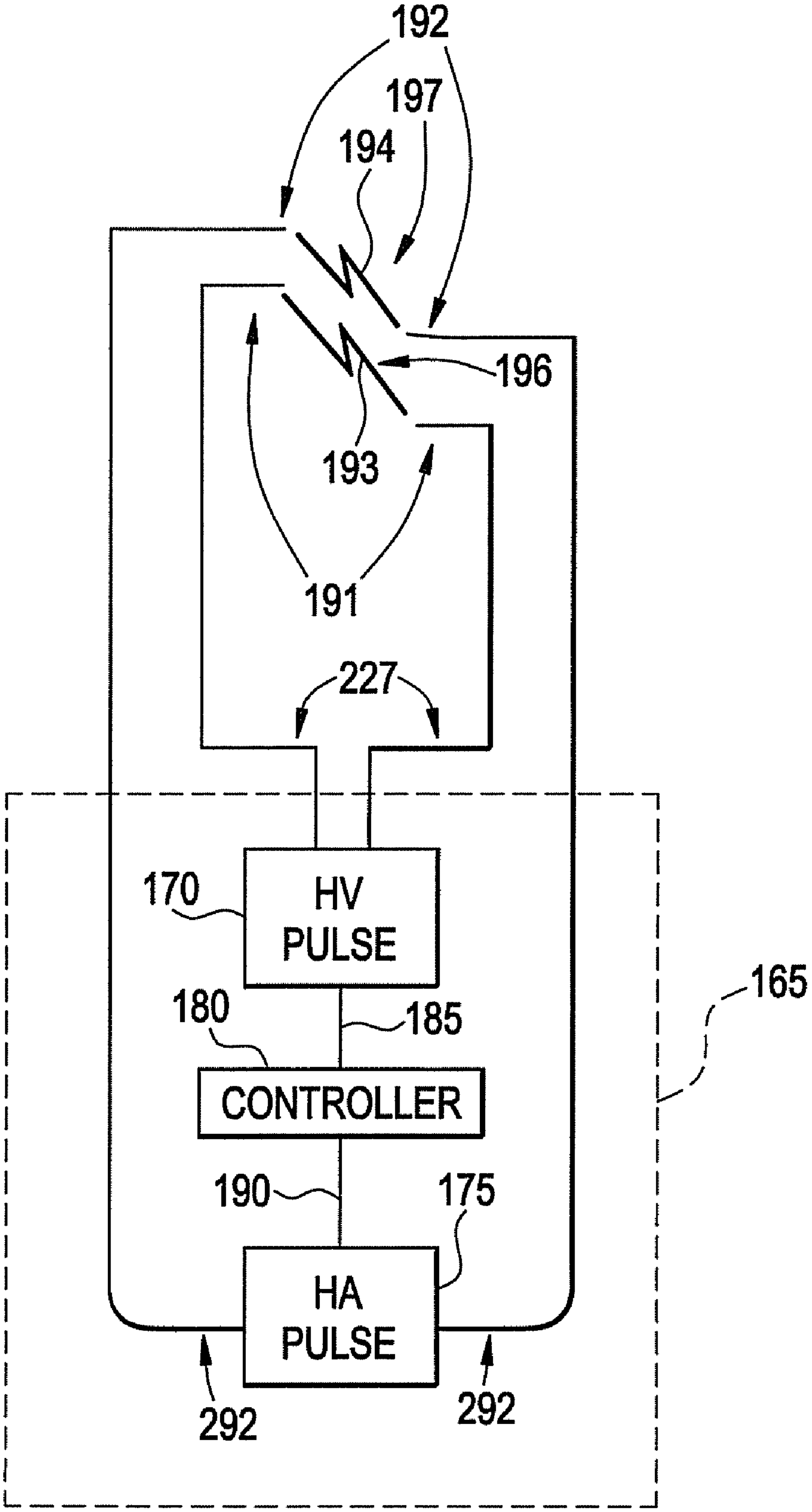
FIG. 1 depicts a schematic diagram of an electrical pulse circuit in accordance with an embodiment of the invention.

FIG. 1 depicts a schematic diagram of one embodiment of a pulse generator (also herein referred to as "an electrical pulse circuit") 165 to generate the high-current pulse, such as may be suitable for use with a plasma gun 20 (best seen with reference to FIG. 4) to generate conductive plasma vapors 50 (best seen with reference to FIG. 4), for example. While an embodiment of the pulse generator 165 has been described for use with the plasma gun 20, it will be appreciated that the scope of the invention is not so limited, and that the invention will also apply to pulse generators 165 used to develop the high current pulse in other applications, such as rail guns, spark gap switches, lighting ballasts, series capacitor protection circuits, and testing of lightening arrestor discs or Zinc Oxide (ZnO) non-linear elements, for example.

The pulse generator 165 includes a high voltage electrical pulse source 170, a high current electrical pulse source 175, and a controller 180 to provide a trigger or enable signal 185, 190 to the pulse sources 170, 175. In one embodiment, the high voltage pulse source 170 and high current pulse source 175 are in power connection, respectively, with a first pair of pulse electrodes 191 and a second pair of pulse electrodes 192. The high voltage pulse source 170 generates a voltage high enough to overcome the breakdown voltage of air corresponding to a first gap 196 defined between ends of the first pair of electrodes 191 and thereby generate a first arc 193 (also herein referred to as a "high voltage low current arc"). In an embodiment, the current of the first arc 193 may be less than that necessary to generate desired plasma vapors 50. Ionization associated with the first arc 193 significantly reduces impedance across and proximate the first gap 196. The first gap 196 is disposed proximate a second gap 197, defined between ends of the second pair of electrodes 192, such that an impedance across the second gap 197 is significantly reduced in response to generation of the first arc 193.

The reduced impedance across the second gap 197, resulting from ionization in response to the first arc 193, allows creation of a second arc 194 (also herein referred to as a "low voltage high current arc") by the high current pulse source 175 with a voltage that is significantly less than the breakdown voltage of air corresponding to the second gap 197. A greater current level of the second arc 194 generates adequate radiation to produce the desired conductive plasma vapors 50 shown in FIG. 1.

Figure 2:
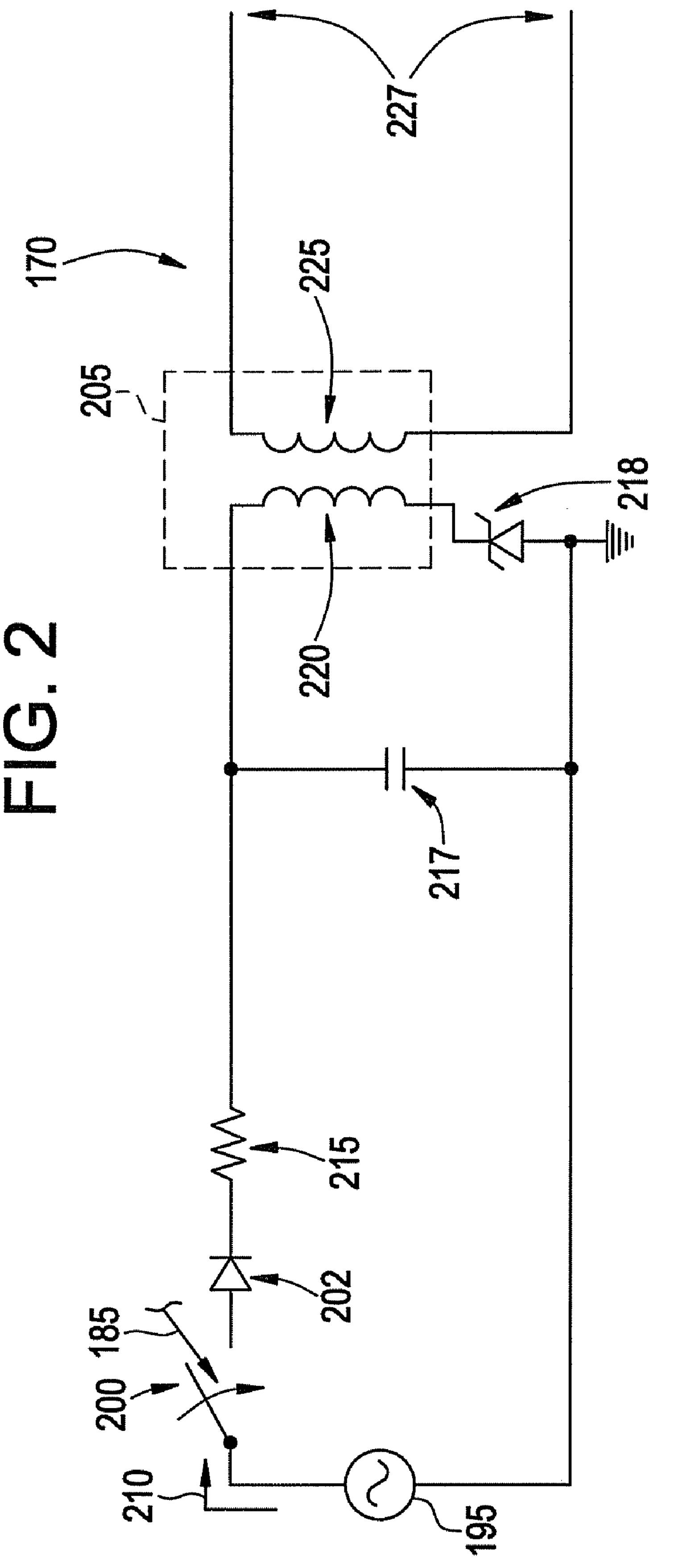
FIG. 2 depicts a schematic diagram of a high voltage source of the electrical pulse circuit in accordance with an embodiment of the invention.

FIG. 2 depicts one embodiment of the high voltage pulse source 170, such as a transformer pulse source 170. The transformer pulse source 170 includes a power source 195, a switch 200, a rectifier 202, and a transformer 205, such as a pulse transformer 205. In an exemplary embodiment, the power source 195 is productive of a first voltage, such as 120 volts alternating current for example. The switch 200 is disposed in series with the power source 195 and in signal communication with the controller 180. The switch 200 is responsive to the controller 180 via the trigger signal 185 to close, thereby allowing current 210 to flow from the power source 195 through the switch 200, and a resistor 215 and capacitor 217 that define a resistive-capacitive charging circuit. A charge from current 210 is stored within capacitor 217. In response to the capacitor 217 charging to a specific voltage, a diode 218 short circuits or breaks down at the specific voltage, thereby allowing the charge stored within capacitor 217 to flow through a primary winding 220 of the transformer 205. Diode 218 provides what may be known as a "spark gap", such as may be used within high voltage ballasts, for example. Although resistor 215 is represented as a discrete resistor 215, it will be appreciated that the resistor 215 may be an equivalent resistance resulting from the primary winding 220 of the transformer 205, for example. In response to the current 210 through the primary winding 220, a second voltage potential is established via a secondary winding 225 of the transformer 205 across a first pair of conductors 227. In an embodiment, the second voltage potential across the first pair of conductors 227 is provided across the first pair of electrodes 191. The voltage potential between the first pair of conductors 227 is related to the first voltage potential and a turns ratio of the primary and secondary windings 220, 225. In one embodiment, the second voltage potential between the first pair of conductors 227 is greater than 5,000 volts, with an arcing current of less than 5 amps. In another embodiment, the voltage potential between the first pair of conductors 227 is greater than 10,000 volts with an arcing current of less than 1 amp. A duration of the current 210 is determined and controlled by controller 180 via the trigger signal 185 and switch 200. In one embodiment, the controller 180 closes the switch 200 for a duration equal to a desired duration of both the first arc 193 and the second arc 194.

While an embodiment of the high voltage pulse source 170 has been depicted including a pulse transformer, it will be appreciated that the scope of the invention is not so limited, and may apply to embodiments of the high voltage pulse source 170 that utilize other means to generate the voltage potential between the first pair of conductors 227, such as a capacitor discharge circuit, a lighting ballast circuit, and an ignition coil circuit, for example.

Figure 3:
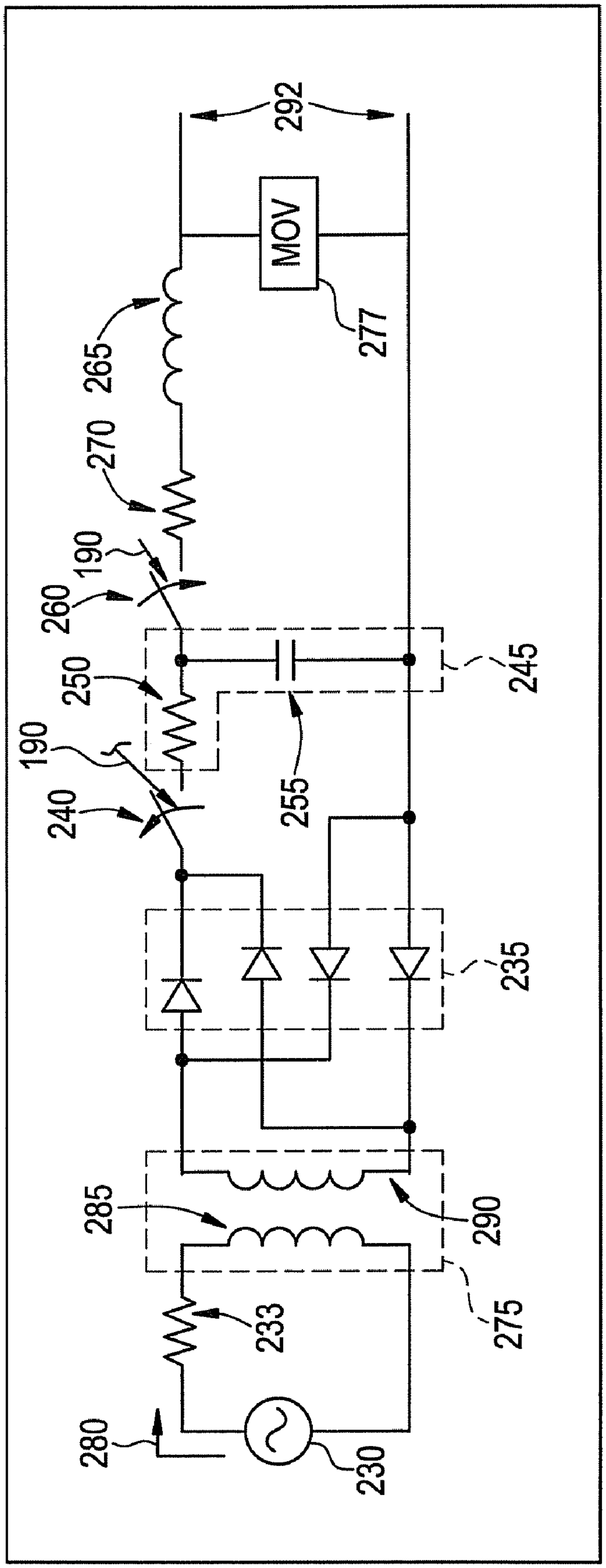
FIG. 3 depicts a schematic diagram of a high current source of the electrical pulse circuit in accordance with an embodiment of the invention.

FIG. 3 depicts one embodiment of the high current pulse source 175, such as a capacitor discharge pulse source 175. The capacitor discharge pulse source 175 includes a power source 230, a resistor 233, a rectifier 235, a charging switch 240, a charging circuit 245, and a discharge switch 260. An inductor 265 and a resistor 270 are connected in series with the discharge switch 260. The pulse source 175 may optionally include a transformer 275 to step-up the voltage of the power source 230, such as from 120 volts alternating current to 480 volts alternating current, for example. Optionally, a metal oxide varistor 277 may be connected in parallel with a second pair of conductors 292 to protect the capacitor discharge pulse source 175 from excessive transient voltage, such as may be generated by the high voltage pulse source 170, for example. The charging circuit 245 includes a resistor 250 connected in series with a capacitor 255 that is connected in parallel across the second pair of conductors 292.

The charging switch 240 is in power connection between the rectifier 235 and the charging circuit 245 and in signal communication with the controller 180. The discharge switch 260 is in power connection between the charging circuit 245 and the second pair of electrodes 192 via conductors 292. The switches 240, 260 are responsive to the trigger 190 to open and close, respectively.

Prior to receiving the trigger 190 signal, charging switch 240 is closed and discharge switch 260 is open. Current 280 from the power source 230 flows through resistor 233 and primary winding 285 of the transformer 275. In response to the current 280 through the primary winding 285, a current and voltage are established via a secondary winding 290 of the transformer 275. The current and voltage established by the secondary winding 290 is converted to direct current via the rectifier 235. The direct current converted by the rectifier 235 flows through the switch 240 and resistor 250 and charges the capacitor 255.

In response to the trigger 190 provided by the controller 180, the charging switch 240 opens, thereby discontinuing charging of the charging circuit 245 from the power source 230. Additionally, the discharge switch 260 closes in response to the trigger 190, allowing the charge stored within the capacitor 255 to flow through the resistor 270 and inductor 265. The closing of the discharge switch 260 thereby establishes a voltage potential across the second pair of conductors 292. In an embodiment, the voltage potential across the second pair of conductors 292 provides a voltage potential across the second pair of electrodes 192 to generate the second arc 194 (shown in FIG. 1).

Use of the high voltage pulse source 170 to initiate the first arc 193 thereby allows the high current pulse source 175 to generate the second arc 194 with an operating voltage that is less than the breakdown voltage of air across the gap 197 between the second pair of electrodes 192 that the second arc 194 crosses. It is contemplated that the operating voltage of the high current pulse source 175 can be approximately 600 volts or less, which allows use of the capacitor 255 within the charging circuit 245 to have capacitance values within the microfarad range. Such capacitors 255 having capacitance values in the microfarad range are appreciated to be less costly than capacitors having capacitance values within the millifarad range. In one embodiment, the capacitor 255 has a capacitance value less than 500 microfarads. In another embodiment, the capacitor 255 has a capacitance value less than 250 microfarads.

Figure 4:
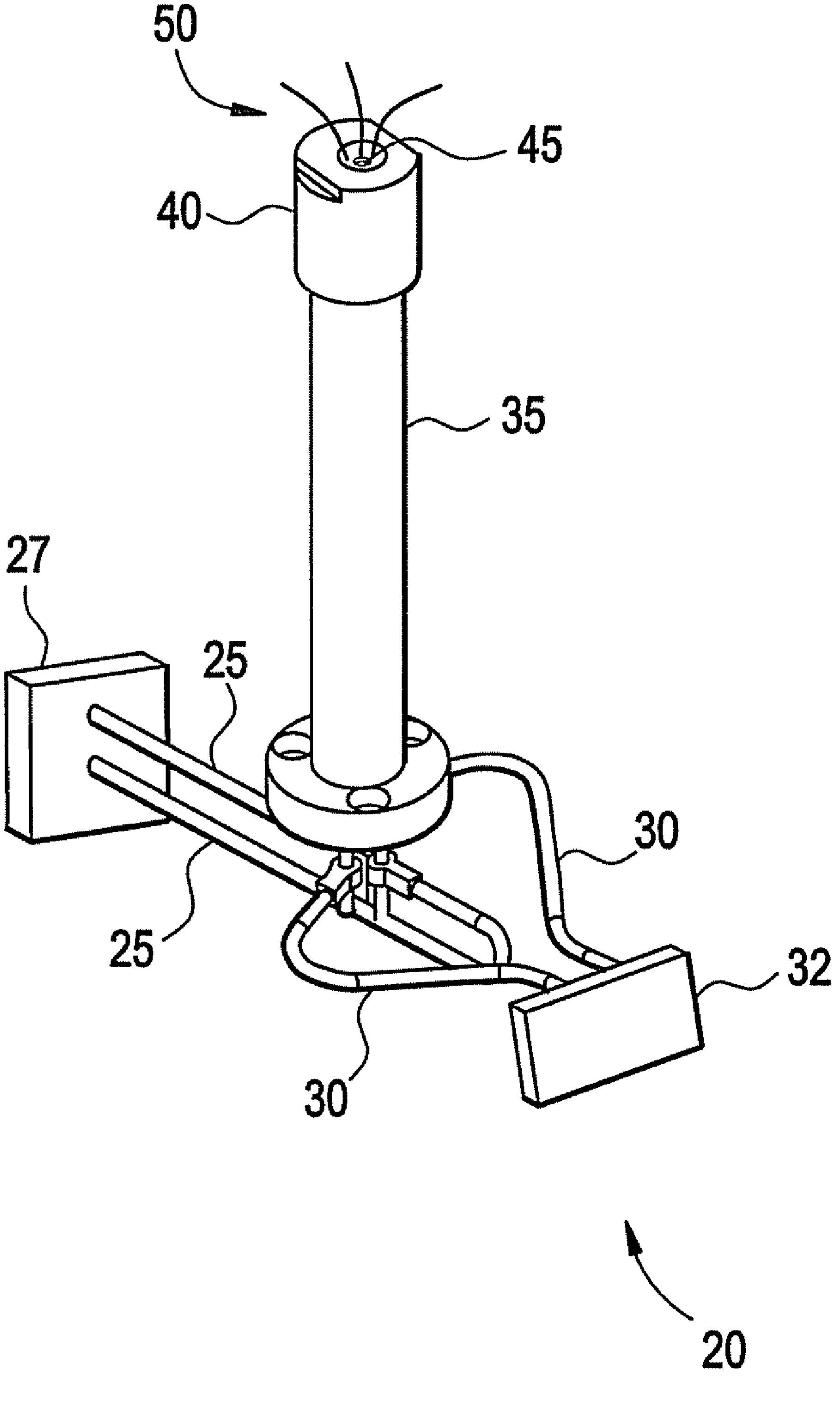
FIG. 4 depicts a perspective view of a dual electrode plasma gun in accordance with an embodiment of the invention.

In view of the foregoing, FIG. 4 depicts an embodiment of the plasma gun 20, such as a dual electrode plasma gun 20, which is one exemplary utilization of the pulse generator 165. The plasma gun 20 includes at least a first pair of conductors 25, such as the first pair of conductors 227 for example, and a second pair of conductors 30, such as the second pair of conductors 292 for example. Each pair of conductors 25, 30 is in power connection with a corresponding pulse trigger circuit 27, 32, such as the pulse sources 170, 175 for example, and pair of gun electrodes 55, 60 (best seen with reference to FIG. 5), as will be described further below. The plasma gun 20 includes a barrel 35 (also herein referred to as a "body") and a cap 40 having an orifice 45. The cap 40 is disposed upon the barrel 35 proximate the gun electrodes (shown in FIG. 6). In an embodiment, the orifice 45 defines a divergent nozzle that diverges in a direction leading away from the pairs of gun electrodes 55, 60, and plasma gun 20 emits conductive ionic plasma vapors 50 out of the orifice 45 in a spreading pattern at supersonic speed.

Figure 5:
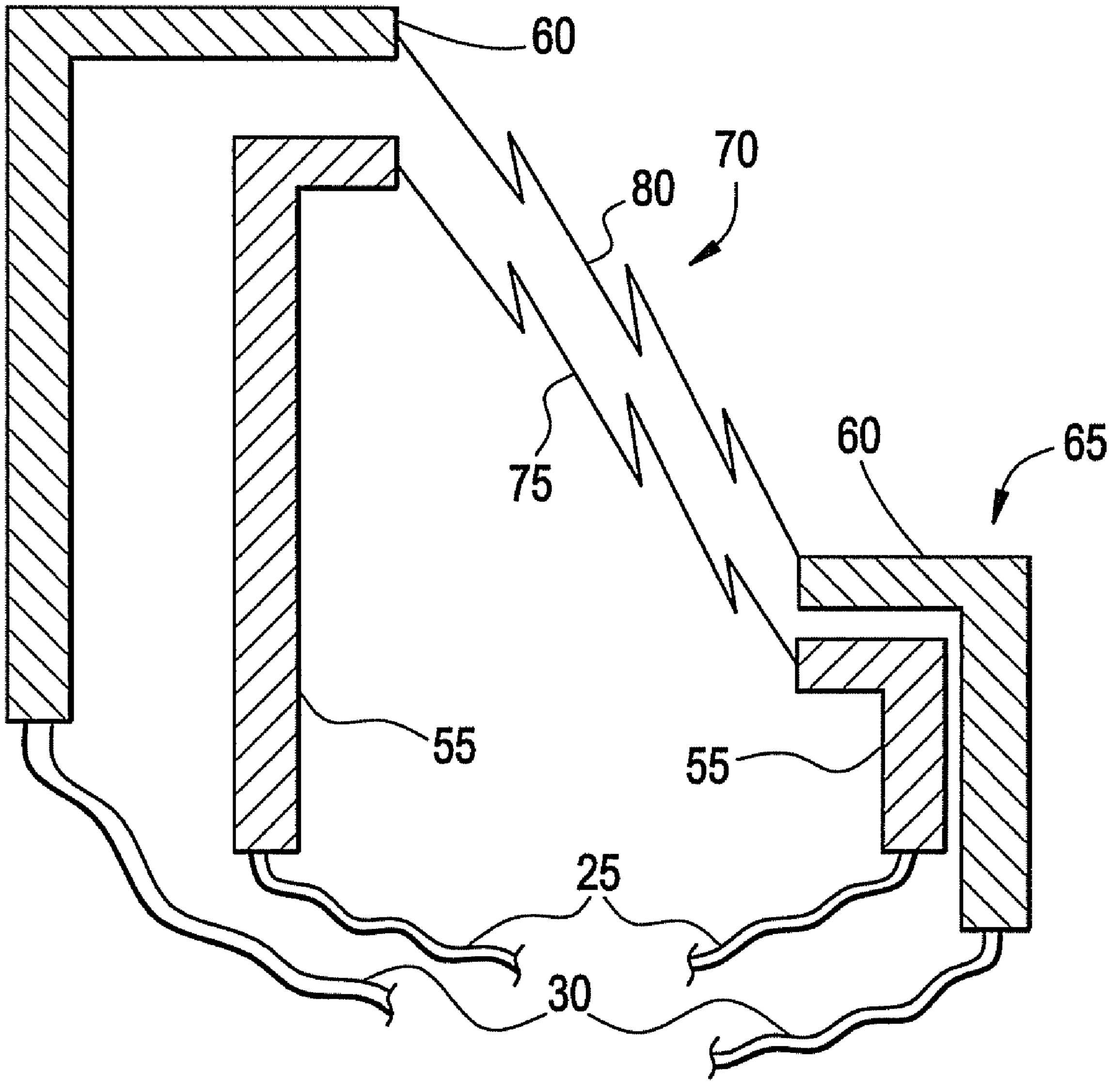
FIG. 5 depicts a schematic view of a first pair and a second pair of plasma gun electrodes in accordance with an embodiment of the invention.

FIG. 5 depicts a schematic view of a first pair of gun electrodes 55 and a second pair of gun electrodes 60, such as the first pair and second pair of pulse electrodes 191, 192 for example, disposed proximate each other within an interior of the barrel 35. As used herein reference numeral 65 shall refer to plasma gun 20 electrodes generally. The first pair and second pair of gun electrodes 55, 60, are in power connection with the pairs of conductors 25, 30, respectively. A plurality of arcs 70 are depicted disposed between the pairs of gun electrodes 55, 60. In an embodiment, a first arc 75, such as the first arc 193 for example, is generated between the first pair of gun electrodes 55 and a second arc 80, such as the second arc 192 for example, is generated between the second pair of gun electrodes 60. Each of the first arc 75 and the second arc 80 may include more than one arc disposed between the pair of gun electrodes 65.

Generation of the first arc 75 represents a high voltage, low current pulse that requires a voltage potential between the first pair of gun electrodes 55 that is directly related to the distance between the electrodes 65 of the first pair of electrodes 55. In one embodiment, the voltage necessary to generate the first arc 75 must be greater than the breakdown voltage of air, which is about 30,000 volts per centimeter of distance or gap between the electrodes 65. In response to generation of the first arc 75 between the first pair of gun electrodes 55, an impedance between the first pair of gun electrodes 55 is significantly reduced. Furthermore, in response to generation of the first arc 75, an impedance surrounding the first arc 75, such as between the second pair of gun electrodes 60, is also reduced. Accordingly, in response to generation of the first arc 75, a voltage required to generate the second arc 80, which represents a low voltage, high current pulse is significantly reduced as compared to a breakdown voltage in the absence of the first arc 75. For example, in an embodiment, the high voltage, low current pulse is at least 5,000 volts with a current level less than about 5 amps and the low voltage, high current pulse is about 600 volts with a current level greater than 4,000 amps.

Figure 6:
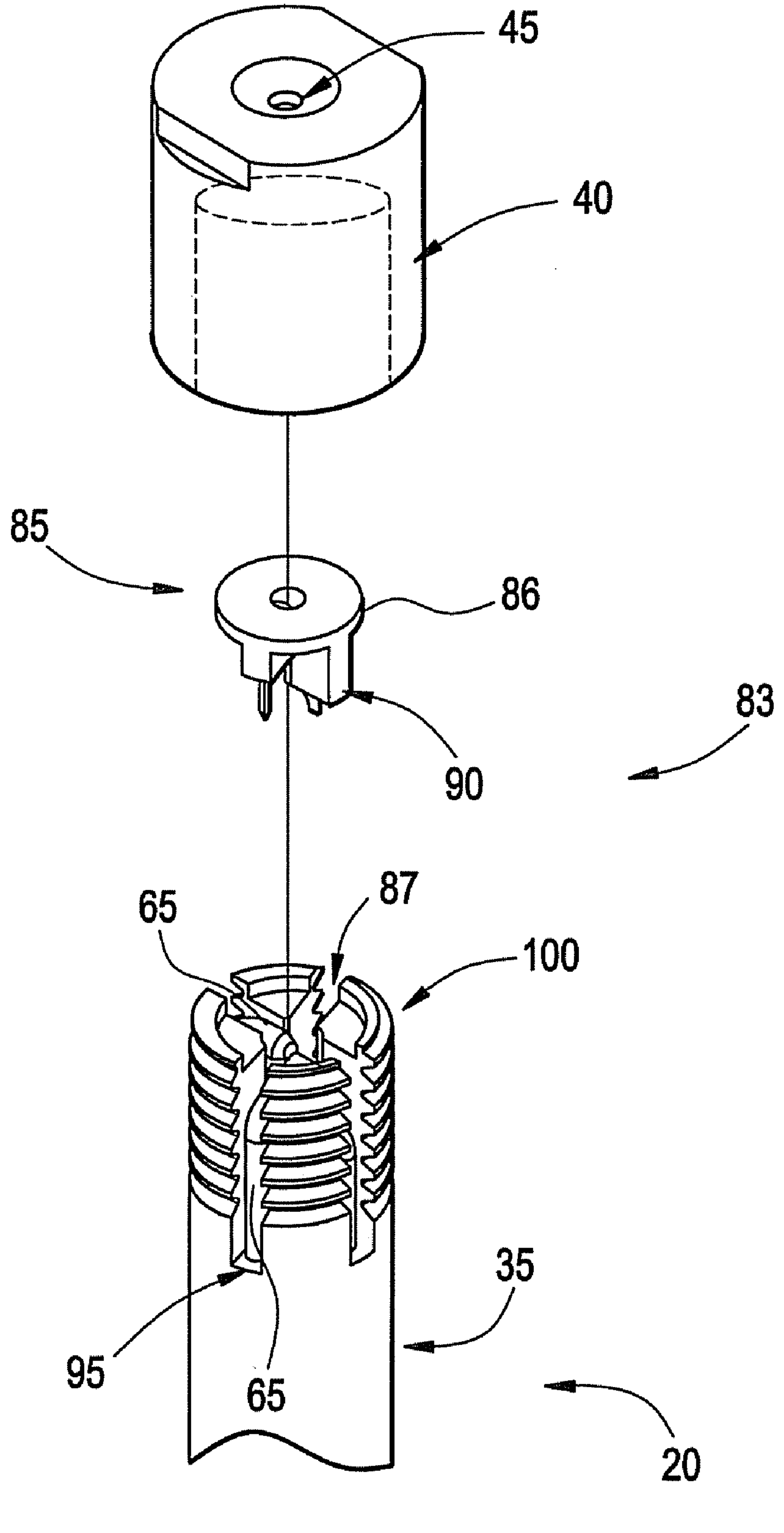
FIG. 6 depicts an enlarged exploded perspective view of the dual electrode plasma gun of FIG. 1 in accordance with an embodiment of the invention.

FIG. 6 depicts an enlarged exploded view of an embodiment of a plasma gun subassembly 83 proximate the cap 40. The subassembly 83 includes the barrel 35 and an ablative material 85. The interior of the barrel 35 defines an interior chamber 87 in which the electrodes 65 are disposed. The ablative material 85 is disposed proximate the electrodes 65, particularly the second pair of electrodes 60 that generate the second arc 80 (best seen in FIG. 5). In one embodiment, the ablative material 85 is an ablative plug 86 that is separate from the cap 40 and the body 35 and may include keys 90 configured to fit within specific slots 95 of the barrel 35 to orient the ablative plug 86 such that it retains the electrodes 65. The ablative material 85 may be a discrete component, such as the ablative plug 86 disposed between the pairs of gun electrodes 55, 60 and the cap 40 as depicted in FIG. 3, or may alternatively be integrated or incorporated within at least one of the barrel 35 and the cap 40. Threads 100 may be disposed upon the barrel 35 to secure and retain the cap 40.

Characteristics of the plasma vapors 50 (shown in FIG. 1) such as velocity, ion concentration, and spread, may be controlled by dimensions and separation of the electrodes 65, dimensions of the interior chamber 87, proximity of electrodes 65 relative to the ablative material 85, the type of ablative material 85, a pulse shape and energy corresponding to the arcs 70, and the shape and size of the orifice 45. The ablative material 85 may be a thermoplastic, such as Polytetrafluoroethylene, Polyoxymethylene Polyamide, Poly-methyle-methacralate (PMMA), other ablative polymers, or various mixtures of these materials, including composites.

As described above, with reference to FIG. 5, the second pair of gun electrodes 60 are disposed proximate the first pair of gun electrodes 55 such that in response to generation of the first arc 75 across a first gap between the first pair of gun electrodes 55, a breakdown voltage across a second gap between the second pair of gun electrodes 60 is significantly reduced as compared to the breakdown voltage in the absence of the first arc 75. For example, it will be appreciated that a breakdown voltage of air between a second gap having a dimension of 3 millimeters is approximately 9,000 volts. In one embodiment, in response to generation of the first arc 75 across the first gap, the breakdown voltage across the second gap is less than 2,700 volts, or reduced by 70 percent, to 30 percent of the breakdown voltage of air corresponding to the second gap in the absence of the first arc 75. In another embodiment, in response to generation of the first arc 75, the breakdown voltage across the second gap is less than 900 volts, or reduced by 90 percent, to 10 percent of the breakdown voltage of air corresponding to the second gap in the absence of the first arc 75. In yet another embodiment, generation of the first arc reduces the breakdown voltage across the second gap by approximately 94 percent to less than 480 volts, or approximately 6 percent of the breakdown voltage of air corresponding to the second gap in the absence of the first arc 75.

With reference now to FIGS. 5 and 6, at least one of the first arc 75 and the second arc 80, proximate the ablative materials 85 of at least one of the plug 86, barrel 35, and cap 40, shall have an adequate current level to provide ablation of the ablative material 85 to generate the conductive ablative plasma vapors 50 (shown in FIG. 1). Adequate current levels to initiate ablation of the ablative materials and generate the ablative plasma vapors 50 are typically greater than 5,000 amps (5 kA). Accordingly, use of the pulse generator 165 in conjunction with the dual electrode plasma gun 20 facilitates formation of the high current second arc 80 at voltages lower than the breakdown voltage of air between the gun electrodes 65. Radiation resulting from high current second arc 80 provides adequate ablation from the ablative material 85 to provide a high-energy plasma.

Use of the pulse generator 165 in conjunction with the dual electrode plasma gun 20 has successfully generated desired plasma vapors 150 with a triggering pulse 8/20 (for example, a pulse with a rise time of about 8 microseconds and a fall time of about 20 microseconds) with the high voltage pulse of the first arc 193 having a voltage of about 10,000 volts (10 kV) and current of less than 1 amp, and the high current pulse of the second arc 194 having a voltage of about 480 volts and current of about 5000 amps. In contrast, a conventional pulse generator, absent the first and second pair of electrodes 191, 192, would be required to develop a trigger pulse having a voltage and current of about 20,000 volts and 5,000 amps, making the conventional pulse generator and its circuitry much more expensive than the pulse generator 165.

Figure 7:
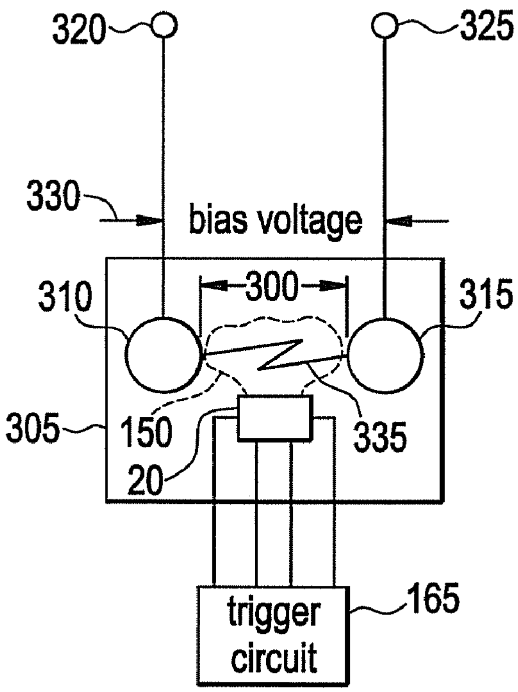
FIG. 7 depicts a general circuit diagram of a dual electrode ablative plasma gun used to trigger an electric arc device in accordance with an embodiment of the invention.

In view of the foregoing, FIG. 7 is a general schematic diagram of the pulse generator 165 in conjunction with the dual electrode plasma gun 20 that may be used to trigger a main gap 300 of a main arc device 305. In the context of the foregoing sentence, the term "main" is used to distinguish elements of a larger arc-based device from corresponding elements of the present plasma gun 20 (for example, used as a trigger), since the plasma gun 20 also constitutes an arc-based device. The main arc device 305 may be for example an arc mitigation device (also herein referred to as an "arc absorber"), a series capacitor protective bypass, a high power switch, an acoustic generator, a shock wave generator, a pulsed plasma thruster, or other arc devices.

Generally, a main arc device 305 has two or more main electrodes 310, 315 separated by a gap 300 of air or another gas. Each electrode 310, 315 is connected to an electrically different portion 320, 325 of a circuit, such as different phases, neutral, or ground for example. This provides a bias voltage 330 across the arc gap 300. A trigger circuit, such as the pulse generator 165, is in power communication with the plasma gun 20 and provides the high voltage (low current) and high current (low voltage) pulses to the plasma gun 20, causing it to inject ablative plasma vapors 150 into the main gap 300, lowering the gap 300 impedance to initiate a main arc 335 between the electrodes 310, 315.

Figure 8:
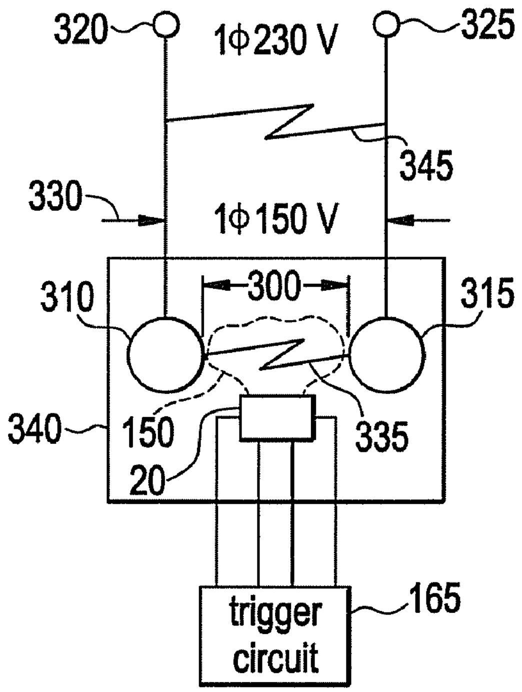
FIG. 8 depicts an exemplary circuit diagram of a dual electrode ablative plasma gun trigger of an electric arc device in accordance with an embodiment of the invention.

FIG. 8 shows an example of a circuit used in testing an arc mitigation device 340. An arc flash 345 on the circuit 320, 325 is shown reducing the bias voltage 330 available across the gap 300. The impedance of the main electrode gap 300 may be designed for a given voltage by the size and spacing of the main electrodes 310, 315, so as not to allow arcing until triggering. Based upon characteristics of the conductive plasma vapors 150, the impedance of the main gap 300 can be designed to produce a relatively fast and robust main arc 335 in response to triggering of the plasma gun 20.

As disclosed, some embodiments of the invention may include some of the following advantages: a pulse generator capable of generating high current pulses having an overall lower cost; a pulse generator capable of generating high current pulses using lower cost high-energy microfarad range capacitors; and a plasma gun providing conductive ablative plasma vapors using a low cost dual source pulse generator.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. An electrical pulse circuit in connection with a first pair of electrodes defining a first gap between ends thereof and a second pair of electrodes defining a second gap between ends thereof, the second gap disposed proximate to the first gap, the circuit comprising:

a controller;

a first electrical pulse source in power connection with the first pair of electrodes, the first electrical pulse source productive of a high voltage low current arc across the first gap in response to the controller; and a second electrical pulse source in power connection with the second pair of electrodes, the second electrical pulse source productive of a low voltage high current arc across the second gap in response to the controller and the high voltage arc.

2. The electrical pulse circuit of claim 1, wherein:

a voltage of the low voltage high current arc is less than a breakdown voltage of air corresponding to the second gap in the absence of the high voltage low current arc.

3. The electrical pulse circuit of claim 1, wherein:

the first gap is disposed proximate the second gap such that an impedance of the second gap is significantly reduced as compared to an impedance of the second gap in the absence of the high voltage low current arc.

4. The electrical pulse circuit of claim 1, wherein the first electrical pulse source comprises:

a power source;

a switch disposed in series with the power source, the switch in signal communication with the controller; and a pulse transformer having a primary winding and a secondary winding, the primary winding in power connection with the power source through the switch;

wherein the secondary winding is in power connection with the first pair of electrodes.

5. The electrical pulse circuit of claim 4, wherein:

the switch is responsive to a trigger signal from the controller to close.

6. The electrical pulse circuit of claim 5, wherein:

in response to the trigger signal, a voltage across the first gap is greater than a breakdown voltage corresponding to the first gap, thereby producing the high voltage low current arc.

7. The electrical pulse circuit of claim 1, wherein:

a voltage of the high voltage low current arc is greater than a breakdown voltage of air corresponding to the first gap.

8. The electrical pulse circuit of claim 1, wherein the second electrical pulse source comprises:

a power source;

a rectifier in power connection with the power source; and a charging circuit in power connection with the rectifier and the second pair of electrodes.

9. The electrical pulse circuit of claim 8, wherein:

the charging circuit comprises a capacitor in parallel connection with the second pair of electrodes; and a resistor in series connection with the capacitor.

10. The electrical pulse circuit of claim 9, wherein:

the capacitor has a capacitance value less than 500 microfarads.

11. The electrical pulse circuit of claim 10, wherein:

the capacitor has a capacitance value less than 250 microfarads.

12. The electrical pulse circuit of claim 8, wherein the second electrical pulse source further comprises:

a first switch in signal communication with the controller and in power connection between the rectifier and the charging circuit; and a second switch in signal communication with the controller and in power connection between the charging circuit and the second pair of electrodes.

13. The electrical pulse circuit of claim 12, wherein:

the first switch is responsive to a trigger signal from the controller to open; and the second switch is responsive to the trigger signal to close.

14. The electrical pulse circuit of claim 8, the second electrical pulse source further comprising:

a metal oxide varistor connected in parallel with the charging circuit.

15. An electrical pulse circuit in connection with an ablative plasma gun subassembly comprising a first pair of gun electrodes, a second pair of gun electrodes, and ablative material disposed proximate at least one of the first and the second pairs of gun electrodes, the ablative plasma gun subassembly disposed within a main arc device, the main arc device comprising two or more main electrodes, each electrode of the two or more main electrodes connected to an electrically different portion of a main electric circuit, the electrical pulse circuit comprising:

a controller;

a first electrical pulse source in power connection with the first pair of gun electrodes, the first electrical pulse source productive of a high voltage low current arc across the first pair of gun electrodes in response to the controller; and a second electrical pulse source in power connection with the second pair of gun electrodes, the second electrical pulse source productive of a low voltage high current arc across the second pair of gun electrodes in response to the controller and the high voltage arc;

wherein the ablative plasma gun is responsive to the low voltage high current arc to inject an ablative plasma into a main gap between the two or more main electrodes of the main arc device, thereby triggering an arc between the two or more main electrodes.

16. The electrical pulse circuit of claim 15, wherein:

the main arc device is an arc mitigation device, a series capacitor protective bypass, a high power switch, an acoustic generator, a shock wave generator, or a pulsed plasma thruster.

17. The electrical pulse circuit of claim 15, wherein:

the first pair of gun electrodes are disposed proximate the second pair of gun electrodes such that an impedance of the second pair of gun electrodes is significantly reduced as compared to an impedance of he second gap in the absence of the high voltage low current arc.

* * * * *

UNITED STATES PATENT AND TRADEMARK OFFICE

CERTIFICATE OF CORRECTION

PATENT NO. : 8,053,699 B2
APPLICATION NO. : 11/945677
DATED : November 8, 2011
INVENTOR(S) : Roscoe et al.

It is certified that error appears in the above-identified patent and that said Letters Patent is hereby corrected as shown below:

In Column 6, Lines 21-22, delete “Poly-methyle-methacralate” and insert -- Poly-methyl-methacrylate --, therefor.

In Column 7, Line 60, delete “thereof” and insert -- thereof. --, therefor.

In Column 9, Line 21, in Claim 14, delete “8, the” and insert -- 8, wherein the --, therefor.

In Column 10, Line 29, in Claim 17, delete “he” and insert -- the --, therefor.

Signed and Sealed this
Sixth Day of March, 2012

David J. Kappos
*Director of the United States Patent and Trademark Office*